Patented Mar. 13, 1951

2,544,709

UNITED STATES PATENT OFFICE 2,544,709

METHOD OF PREPARING LOW MOLECULAR WEIGHT ISOCYANATES

John Philip Mason, Westwood, Mass., assignor to Armstrong Cork Company, Lancaster, Pa., a corporation of Pennsylvania No Drawing. Application April 14, 1947,
Serial No. 741,424

8 Claims. (Cl. 260—453)

This invention relates to a method of preparing low molecular weight isocyanates. More particularly, this invention relates to a method of preparing low molecular weight isocyanates having from 2 to 10 carbon atoms.

Isocyanates have been successfully employed in a number of uses, such as intermediates for the production of numerous chemicals and, particularly, as treating agents for textiles and other related materials. The isocyanates impart a high degree of water repellence to material treated therewith and, thus, are valuable reagents in the manufacture of water-repellent fabrics. The unsaturated isocyanates have been polymerized to form polyisocyanates which react with a variety of materials containing active hydrogen, such as hydroxylated compounds, to produce polyurethanes, and with aqueous mineral acids to produce polyamine salts.

Heretofore, the most economical and probably the most widely-used method of preparing isocyanates is that involving the treatment of a primary amine with phosgene and then heating the resulting product. The reactions involved are indicated by the following equations.

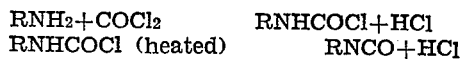

This method is, however, incapable of producing isocyanates, such as vinyl isocyanate, because the corresponding amines are unknown. For instance, all attempts to prepare vinyl amine have resulted in the formation of ethyleneimine.

It is, accordingly, an object of this invention to provide a method of preparing low molecular weight isocyanates which may be employed in the production of both saturated and unsaturated isocyanates.

It is a further object of this invention to provide a method of preparing low molecular weight isocyanates which is capable of being carefully controlled during the preparation.

These and other objects of the invention will become apparent to those skilled in the art upon becoming familiar with the following description.

I have found that it is possible to obtain a reaction between low molecular weight acid halides or acid anhydrides dissolved in a water-miscible organic solvent and an aqueous solution of a metal azide at low temperatures to produce an acid azide which may then be decomposed by heat to produce the desired isocyanate.

The acid halides which may be employed may be the chlorides, bromides, iodides, or fluorides of the desired acid. However, for practical purposes, it is advantageous to utilize an acid chloride as a starting material. The starting material, in accordance with my invention, is advantageously an acid halide or anhydride of saturated and unsaturated acids, such as aliphatic acids, containing from 2 to 10 carbon atoms. Examples of the materials which may be used are the acid chlorides or anhydrides of such acids as acetic acid, propionic acid, butyric acid, valeric acid, caproic acid, enanthic acid, caprylic acid, pelargonic acid, acrylic acid, methacrylic acid, ethylacrylic acid, propylacrylic acid, butylacrylic acid, amylacrylic acid, hexylacrylic acid, heptylacrylic acid, and the like. Particularly advantageous results have been obtained with halides or anhydrides of acids having 2 to 4 carbon atoms.

The metal azides, which may be employed in the production of isocyanates in accordance with my invention may be the alkaline azides, such as alkali metal azides, for example, azides of lithium, sodium, potassium, rubidium, and cesium, or the alkaline earth metal azides, such as azides of calcium, magnesium, barium, and strontium. Generally speaking, advantageous results may be obtained by the use of alkali metal azides, particularly sodium azide.

The temperature at which the reaction between the metal azide and the acid chloride or anhydride is to be carried out may vary between room temperature and the lowest temperature at which an aqueous solution of the metal azide will remain homogeneous. This temperature varies, depending, among other things, upon the concentration of the metal azide solution, as well as any materials which may be present in the solution. For instance, a 27% solution of sodium azide may be cooled to −23° C. before depositing any solid. A mixture containing 12% sodium azide, 47% water, and 41% acetone may be cooled to a temperature of −45° C. before depositing any solid. The reaction, therefore, may be carried out between room temperatures and −45° C. However, higher yields of the desired isocyanate have been obtained when operating at temperatures between 0° C. and −19° C.

While the proportion of the reacting materials may be varied, generally speaking, advantageous results may be obtained by utilizing an excess of the metal azides. For instance, a 40% molar excess of metal azide has been found to be highly desirable in the practice of my invention.

In accordance with my invention, the aqueous metal azide solution is cooled to the desired temperature by a suitable means, such as an ice-salt bath, or by adding solid carbon dioxide to acetone.

A solution of the other reactant, which may be an acid chloride or an acid anhydride, is dissolved in an anhydrous, inert, water-miscible organic solvent, such as a ketone, for example, acetone, a cyclic di-ether, for example, dioxane, and the like. This solution is added to the metal azide solution and an exothermic reaction results. Generally speaking, it is advantageous to add the acid chloride or anhydride at such a rate that the temperature does not rise above the limit set for the particular reaction. It is advantageous to subject the reactants to agitation during the addition of the acid chloride or anhydride to the metal azide. Following the addition of all of this reactant to the metal azide, stirring is advantageously continued for a suitable period, such as 15 to 20 minutes. This stirring time, however, may vary, depending upon the size of the reaction vessel, the type of stirrer, and the like. The resulting solution is separated from any remaining salt by suitable means, such as decantation or filtration, and the two layers are then separated, the organic layer containing dissolved acid azide. The aqueous layer is then extracted with a suitable solvent, such as an aromatic hydrocarbon, for example, benzene, toluene, xylene, and the like, an ether, such as ethyl ether, dibutyl ether, and the like. It is advantageous to subject the aqueous layer to extraction a plurality of times; generally three to four times is sufficient. The resulting extracts are then combined with the anhydrous water-miscible solvent layer and dried by suitable means, such as by means of anhydrous potassium carbonate or by adding a water-immiscible organic solvent, such as benzene, toluene, or xylene to the water-miscible solvent and removing the precipitated water by filtration. Filtration is continued until the turbidity of the solution disappears.

The resulting acid azide is then decomposed by heating the dried solution on a steam bath or oil bath, or by other suitable means. For instance, the acid azide may be decomposed by adding the dry solution dropwise to xylene which had been previously heated to about 75° C. It should be noted that the decomposition of the acid azide is an extremely exothermic reaction, and careful control must be exercised. Under no conditions should the solvent be permitted to evaporate or distill until all of the azide has been decomposed. For this reason, solvents, such as dioxane, are advantageously employed for those isocyanates which distill below 85° C. The solvent to be used, of course, depends upon the boiling point of the isocyanate under preparation. Generally speaking, it is advantageous to employ a solvent boiling at least 15° C. above the boiling point of the particular isocyanate being prepared.

My invention may be more readily understood by reference to the following specific examples which are given by way of illustration and not by way of limitation.

Example I

Forty-six grams of sodium azide (0.7 mole), were dissolved in 150 cc. of water, and the resulting solution was cooled to −19° C. Fifty-one grams of acetic anhydride (0.5 mole) were dissolved in 75 cc. of purified anhydrous dioxane, and the resulting solution was added to the cold aqueous solution at such a rate that the temperature remained between −19° C. and −17° C. After the reaction was complete, the two layers were separated, and the dioxane layer was dried by adding benzene thereto and removing the precipitated water by filtration. The resulting solution was then warmed to 30° C. under a reflux condenser. Nitrogen was liberated and the temperature of the solution rose rapidly to 43° C. Subsequent fractionation yielded 14.9 grams of methyl isocyanate boiling at 42° to 47° C. This constituted a yield of 53%.

Example II

Forty-six grams of sodium azide (0.7 mole) were dissolved in 150 cc. of water, and the resulting solution was cooled to −19° C. A solution of 39.3 grams of acetyl chloride (0.5 mole) dissolved in 75 cc. of purified anhydrous dioxane was added at such a rate that the temperature was held at −19° C. to −17° C. After separation of the two layers and drying the dioxane layer with benzene, as indicated in Example I, the solution was warmed to 60° C. when a rapid evolution of nitrogen was observed. Fractionation yielded 20.1 grams of methyl isocyanate boiling at 45° to 48° C. This constituted a yield of 72%.

Example III

A solution of 46 grams of sodium azide (0.7 mole) in 150 cc. of water was cooled to −2° C. To this cold solution were added 46.5 grams of butyryl chloride (.43 mole) dissolved in 150 cc. of anhydrous acetone. The rate of addition was controlled so that the temperature remained between −2° C. and 0° C. The acetone layer was separated from the water and warmed on a steam bath under a reflux condenser. After complete decomposition of the acid azide, the solution was fractionated, and a yield of 11.5 grams (32%) of propyl isocyanate, boiling at 80° to 85° C. was obtained.

Example IV

A solution of 46 grams of sodium azide (0.7 mole) in 150 cc. of water was cooled to −19° C. To this cold solution were added 46.5 grams of butyryl chloride (.43 mole) dissolved in 75 cc. of anhydrous acetone. The rate of addition was controlled so that the temperature remained between −19° C. and −13° C. The acetone layer was separated from the water and warmed on a steam bath under a reflux condenser. After complete decomposition of the acid azide, the solution was fractionated and a 49% yield of propyl isocyanate, boiling at 80° to 85° C. was obtained.

Example V

A solution of 42 grams of crotonyl chloride dissolved in 150 cc. of dry acetone was added dropwise to a solution of 46 grams of sodium azide dissolved in 100 cc. of water cooled to 0° C. The solution was stirred with a mechanical stirrer, and the temperature was maintained at 2° C. After addition was complete, stirring was continued until the mixture had cooled to −5° C. The acetone layer was separated, and the aqueous layer was extracted three times with 30 cc. portions of ether. The ether extracts were combined with the acetone layer, and the combined acetone-ether solution was dried over anhydrous potassium carbonate and then over anhydrous calcium chloride. The azide decomposed visibly even at room temperature. Before decomposing the acid, an additional 100 cc. of anhydrous acetone were added to insure a sufficient quantity of solvent after removal of the ether. Two grams of finely powdered copper were also added in order to inhibit polymerization. The ether was removed by heating on a steam bath. Fifty cc. additional anhydrous acetone were added, and the mixture was refluxed on the steam bath for 2½ hours. The acetone was then removed by fractional distillation and 8 grams of propenyl isocyanate was collected at 80° C. This constituted a yield of 24%.

*Example VI*

To 36.4 grams (40% excess) of sodium azide dissolved in 90 cc. of water and cooled to —7° C. were added 42.9 grams (0.4 mole) of methacrylyl chloride dissolved in 100 cc. of purified dioxane. The rate of addition was controlled so that the temperature remained below 5° C. This reaction was carried out in a three-necked 500 cc. flask, fitted with a mercury seal stirrer, an addition funnel, a thermometer, and an air vent leading to the laboratory sink. Two hours were necessary for the addition. Stirring was continued for an additional hour, and the temperature of the reaction mixture dropped to —17° C. The mixture was filtered by suction, and the dioxane layer separated. The water layer was extracted with 70 cc. of xylene and this xylene solution was added to the dioxane, and the resulting solution was then cooled to —5° C. The water which was thrown out of solution, as shown by the turbidity, was removed by filtering through dry, double filter paper until all turbidity had disappeared. This solution was then added dropwise to an equal volume of xylene, heated to 75° C. on a steam bath. This decomposition was carried out in a three-necked, 500 cc. flask fitted with a mercury seal stirrer, a reflux condenser, a thermometer and an addition funnel, both the addition funnel and the reflux condenser being equipped with calcium chloride drying tubes. Careful regulation of the addition of the acid azide was necessary in order to obtain smooth decomposition at a temperature of 75° to 80° C. After decomposition was complete, the solution was distilled under a 20-inch fractionating column. Between 58° and 76° C. 18.5 grams of product distilled. Redistillation gave 13 grams of isopropenyl isocyanate boiling at 58° to 62° C. This constituted a yield of 39%.

While, in the above examples, particular molar ratios of the reactants have been set forth, it is to be understood that other ratios may be employed in the practice of my invention. Generally speaking, advantageous results may be obtained by employing about ½ mole to 1½ moles of metal azide to ½ mole of acid chloride or acid anhydride.

In the modification of my invention embodying the preparation of unsaturated isocyanates, it is advantageous to utilize a polymerization inhibitor during the conversion of the acid azide to the isocyanate. The polymerization inhibitor must be one which does not react with isocyanates or acid azides and will not form an explosive metal azide. For these reasons, phenols, primary and secondary amines, and salts, such as cuprous chloride, cannot be used. Inhibitors, such as quinone, anthracene, and acetoneanil, may be used. While the proportion of inhibitor to be employed may be varied within wide limits, a small amount, such as up to 2% by weight of the reaction mass, is generally suitable.

In the specification and in the appended claims, the term "alkaline azide" or its equivalent is intended to include the alkali metal azides and alkaline earth metal azides as exemplified herein.

While my invention has been described with reference to certain particular embodiments and with reference to certain specific examples, the invention is not intended to be limited thereby. Therefore, changes, omissions, substitutions and/or additions may be made without departing from the spirit of the invention as defined in the appended claims which are intended to be limited only as required by the prior art.

I claim:

1. A process of preparing low molecular weight isocyanates which comprises reacting a compound selected from the group consisting of acid halides and acid anhydrides, dissolved in an inert water-miscible organic solvent, with an aqueous solution of a normal metal azide of a metal selected from the class consisting of the alkali metals, the alkaline earth metals, and magnesium at a temperature between room temperature and —45° C. to obtain an acid azide, and decomposing the acid azide to obtain a low molecular weight isocyanate.

2. A process of preparing low molecular weight isocyanates which comprises reacting an aqueous solution of a normal metal azide of a metal selected from the class consisting of the alkali metals, the alkaline earth metals, and magnesium with a compound selected from the group consisting of acid chlorides and acid anhydrides having 2 to 10 carbon atoms, dissolved in an inert water-miscible organic solvent, at a temperature between 0° C. and —45° C. to obtain an acid azide and heating the resulting acid azide to obtain a low molecular weight isocyanate.

3. A process of preparing low molecular weight isocyanates which comprises reacting a compound selected from the group consisting of acid chlorides and acid anhydrides having 2 to 10 carbon atoms, dissolved in an inert water-miscible organic solvent, with an aqueous solution of sodium azide at a temperature between 0° C. and —45° C. to obtain an acid azide and thermally decomposing the acid azide to obtain a low molecular weight isocyanate.

4. A process of preparing low molecular weight isocyanates comprising dissolving a compound selected from the group consisting of acid halides and acid anhydrides containing 2 to 10 carbon atoms in an inert anhydrous water-miscible organic solvent, adding the resulting solution to an aqueous solution of a metal azide while maintaining the temperature between 0° C. and —45° C. thereby forming an acid azide and decomposing the acid azide by heat to obtain a low molecular weight isocyanate.

5. A process of preparing low molecular weight isocyanates comprising forming a solution of a compound selected from the group consisting of acid chlorides and acid anhydrides having 2 to 4 carbon atoms by dissolving said compound in an inert anhydrous water-miscible organic solvent, adding said solution to an aqueous solution of sodium azide, while maintaining a temperature between 0° C. and —45° C. under conditions favoring the formation of an acid azide and decomposing said acid azide by means of heat to obtain a low molecular weight isocyanate.

6. A process of preparing low molecular weight isocyanates having 2 to 4 carbon atoms which comprises forming a solution of a compound selected from the group consisting of acid chlorides and acid anhydrides, by dissolving said compound in an inert water-miscible organic solvent, said compound having a corresponding number of carbon atoms, adding said solution to an aqueous solution of a normal metal azide of a metal selected from the class consisting of the alkali metals, the alkaline earth metals, and magnesium with agitation while maintaining a temperature between 0° C. and −19° C., continuing said agitation sufficiently to form an acid azide and decomposing said acid azide to obtain a low molecular weight isocyanate.

7. A process of preparing low molecular weight isocyanates which comprises reacting a compound containing 2 to 4 carbon atoms and selected from the group consisting of acid chlorides and acid anhydrides, dissolved in an inert water-miscible organic solvent, with sodium azide in aqueous solution at a temperature between 0° C. and −19° C. to obtain an acid azide and thermally decomposing said acid azide to obtain a low molecular weight isocyanate.

8. A process of preparing an unsaturated low molecular weight isocyanate comprising reacting a compound selected from the group consisting of acid chloride and acid anhydride having 2 to 10 carbon atoms, dissolved in an inert water-miscible organic solvent, with a normal metal azide of a metal selected from the class consisting of the alkali metals, the alkaline earth metals, and magnesium, dissolved in water while maintaining the reaction mixture at a temperature between room temperature and −45° C. and thermally decomposing the resulting acid azide in the presence of an unreactive polymerization inhibitor.

JOHN PHILIP MASON.

REFERENCES CITED

The following references are of record in the file of this patent:

UNITED STATES PATENTS

| Number | Name | Date |
|---|---|---|
| 1,768,434 | Blaikie | June 24, 1930 |
| 2,254,562 | Bockmuhl et al. | Sept. 2, 1941 |
| 2,334,476 | Coffman | Nov. 16, 1943 |
| 2,340,757 | Kaase et al. | Feb. 1, 1944 |

OTHER REFERENCES

Schroeter, "Ber. Deut. Chem.," vol. 42 (1909), pp. 3356–59.

Sidgwick, "Organic Chemistry of Nitrogen," (1937), pages 18, and 374–376.